Patented Sept. 30, 1930

1,776,869

UNITED STATES PATENT OFFICE

WILLIAM WYNDHAM TATUM, OF MANCHESTER, ENGLAND, ASSIGNOR TO BRITISH DYE-STUFFS CORPORATION LIMITED, OF MANCHESTER, ENGLAND

PROCESS FOR THE MANUFACTURE AND PRODUCTION OF ANTHRAQUINONE INTERMEDIATES

No Drawing. Application filed February 10, 1926, Serial No. 87,448, and in Great Britain January 11, 1926.

This invention relates to the manufacture of anthraquinone intermediates; and it comprises a method of producing 1.4 diamino-anthraquinone and its derivatives wherein the corresponding leuco 1.4 diamino-anthraquinone is converted into a salt and this salt heated with nitrobenzene; the salt being frequently formed by treating the leuco body with an acid at a lower temperature in the presence of the same nitrobenzene which is subsequently used as an oxidant at a higher temperature; all as more fully hereinafter set forth and as claimed.

Leuco 1.4 diamino-anthraquinone and its various substituted derivatives can be oxidized to the corresponding 1.4 diamino-anthraquinone bodies by heating with nitrobenzene. I have however found that the oxidation goes on more smoothly with production of better yields of purer products and at a lower temperature if a salt of the leuco body rather than the free base be so heated. At low temperatures, the nitrobenzene does not oxidize the leuco bodies and the salts may be conveniently formed in the presence of nitrobenzene; the mixture of the saline body formed and of the nitrobenzene being subsequently heated to produce oxidation. For example, leuco 1.4 diamino-anthraquinone may be suspended in nitrobenzene and treated with a current of hydrochloric acid gas, converting it into the hydrochlorid. The mixture of hydrochlorid and nitrobenzene resulting is heated to cause oxidation at the expense of the nitrobenzene and produce a hydrochlorid of 1.4-diamino-anthraquinone which may then be rapidly converted into 1.4-diamino-anthraquinone by hydrolysis. In the described action the nitro body used acts both as a solvent and as an oxidant. The presence of an organic solvent and of an oxidizing body is essential and nitrobenzene acts in both capacities. Other oxidizing agents may however be used in addition or substitution.

In the co-pending application Serial No. 87,433 of Shepherdson, Tatum and Bunbury there is described a method of obtaining derivatives of 1:4 diaminoanthraquinone directly from leuco-1:4-diaminoanthraquinone by treating the latter with the appropriate reagent (benzoyl chloride, chlorine, etc.) in the presence of an oxidizing solvent such as nitrobenzene. The leuco-1:4-diaminoanthraquinone required is readily obtained by amidation of leucoquinizarin according to the co-pending application 87,447 of Tatum.

The improved method of the present invention is not limited to the oxidation of leuco diamino-anthraquinone itself, but applies also to derivatives of leuco 1.4-diaminoanthraquinone such as (1) Leuco 1.4-dimethyl-diamino-anthraquinone.

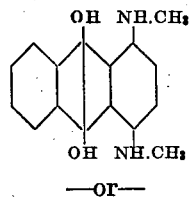

—or—

(2) Leuco-5-hydroxy-8-amino-1.4-dimethylamino-anthraquinone,

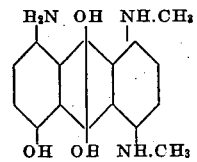

(3) Leuco-5-hydroxy-1.4-dimethyldiamino-anthraquinone.

(4) Leuco-5.6-dihydroxy-1.4-dimethyldiamino-anthraquinone.

The following are examples further illustrating the nature of my invention, but the invention is not limited to the particular details of the examples. The parts stated are by weight.

*Example 1.—Preparation of 1.4-diamino-anthraquinone hydrochloride from leuco 1.4-diamino-anthraquinone hydrochloride*

100 parts of leuco 1.4-diamino-anthraquinone are suspended in 500 parts of nitrobenzene and treated at a temperature of 20–60° C., with a current of hydrochloric acid gas. The brown suspension changes in colour with evolution of heat to greenish yellow, and then to brownish yellow. When there is no further rise in temperature, and a test sample is insoluble in an excess of cold nitrobenzene, the conversion to leuco hydrochloride is complete. Oxidation is then carried out by heating to 110-140° C. for one hour. The 1.4-diamino-anthraquinone hydrochloride obtained is filtered off and freed from nitrobenzene.

By boiling with alkali the product obtained in the above example, pure 1.4-diamino-anthraquinone is liberated, or alternatively, the nitrobenzene filter cake of leuco 1.4-diamino-anthraquinone hydrochloride may be steam distilled in the presence of alkali to give the free base.

*Example 2.—Preparation of 5-hydroxy-8-amino-1.4-dimethyl-diamino-anthraquinone hydrochloride*

100 parts of leuco hydroxy-amino-dimethyldiamino-anthraquinone, which can be obtained, for example by warming leuco-diamino-anthrarufin or leuco diamino-chrysazin with methylamine on the water-bath, are suspended in 600 parts of nitrobenzene and converted into the leuco hydrochloride by passing in hydrochloric acid gas. The brown suspension is then oxidized by heating at 130° C. for one hour, and the resultant hydrochloride of hydroxy-amino-dimethyldiamino-anthraquinone filtered off and dried.

This compound may be conveniently converted into the free base by boiling with dilute alkali, filtering, washing alkali free, and drying.

5-hydroxy-8-amino-1.4-dimethyldiamino-anthraquinone forms a blue powder, insoluble in water but dissolving with a purple colour in dilute mineral acids. The solution in acetic acid is blue, while concentrated sulphuric acid yields a reddish brown solution, which changes to blue on addition of boric acid. An aqueous suspension of the new compound dyes acetate silk in bright greenish blue shades.

I claim:

1. The process of preparing diamino anthraquinones which comprises converting a leuco diamino anthraquinone into its salt form and thereafter heating it in the presence of an organic solvent and an oxidizing agent.

2. The process of preparing diamino anthraquinones which comprises heating the salt form of leuco derivatives of diamino-anthraquinones in the presence of an organic solvent having oxidizing properties.

3. The process of preparing 1:4 diamino anthraquinones which comprises heating a leuco 1:4 diamino anthraquinone hydrochloride in the presence of an organic solvent having oxidizing properties.

4. The process of preparing 1:4 diamino anthraquinones which comprises heating the salt form of a leuco 1:4 diamino anthraquinone in the presence of nitrobenzene.

5. The process of preparing 1:4 diamino anthraquinones which comprises heating a leuco 1:4 diamino anthraquinone hydrochloride in the presence of nitrobenzene.

In testimony whereof I have hereunto affixed my signature.

WILLIAM WYNDHAM TATUM.